US007684795B2

(12) United States Patent
Salmivalli et al.

(10) Patent No.: US 7,684,795 B2
(45) Date of Patent: Mar. 23, 2010

(54) PROCESSING SUBSCRIBER DATA REGARDING SERVICES AVAILABLE TO A SUBSCRIBER IN A VISITED AREA

(75) Inventors: Mika Salmivalli, Ylöjärvi (FI); Vesa Blom, Pirkkala (FI)

(73) Assignee: Nokia Corporation, Espoo (FI)

( * ) Notice: Subject to any disclaimer, the term of this patent is extended or adjusted under 35 U.S.C. 154(b) by 1923 days.

(21) Appl. No.: 10/130,834

(22) PCT Filed: Nov. 30, 2000

(86) PCT No.: PCT/FI00/01050

§ 371 (c)(1),
(2), (4) Date: May 22, 2002

(87) PCT Pub. No.: WO01/39575

PCT Pub. Date: Jun. 7, 2001

(65) Prior Publication Data

US 2002/0173307 A1 Nov. 21, 2002

(30) Foreign Application Priority Data

Dec. 2, 1999 (FI) .................................. 19992594

(51) Int. Cl.
H04W 4/00 (2006.01)
(52) U.S. Cl. ................. 455/433; 455/432.1; 455/435.1; 455/435.2; 455/435.3
(58) Field of Classification Search ................. 455/433, 455/33.1, 33.2, 432.3, 403, 422.1, 432.1, 455/435.1–435.5
See application file for complete search history.

(56) References Cited

U.S. PATENT DOCUMENTS

| 6,032,044 | A | * | 2/2000 | Shannon et al. | ............. 455/433 |
| 6,101,386 | A | * | 8/2000 | Dettner | ....................... 455/433 |
| 6,101,387 | A | * | 8/2000 | Granberg et al. | ............ 455/433 |
| 6,138,016 | A | * | 10/2000 | Kulkarni et al. | ............ 455/433 |
| 6,445,920 | B1 | * | 9/2002 | Pfundstein | ............... 455/422.1 |

(Continued)

FOREIGN PATENT DOCUMENTS

EP    1 065 904    1/2001

(Continued)

OTHER PUBLICATIONS

EP001065904A1.*

*Primary Examiner*—Vincent P Harper
*Assistant Examiner*—Khai M Nguyen
(74) *Attorney, Agent, or Firm*—Harrington & Smith

(57) ABSTRACT

A mobile communication system includes a home location register that transmits an inquiry to the visitor location register about services supported by the visitor location register in response to receiving a location update message, receives a reply from the visitor location register, determines the services supported by the visitor location register based on the reply received from the visitor location register and transmits information to the visitor location register on services that, according to the information stored in the home location register, are available to the subscriber and that are supported by the visitor location register. Similarly, the visitor location register receives the inquiry about the services from the home location register, transmits the information to the home location register on the services supported by the visitor location register in response to the inquiry, and receives the transmitted information.

6 Claims, 2 Drawing Sheets

U.S. PATENT DOCUMENTS

Figure 1:
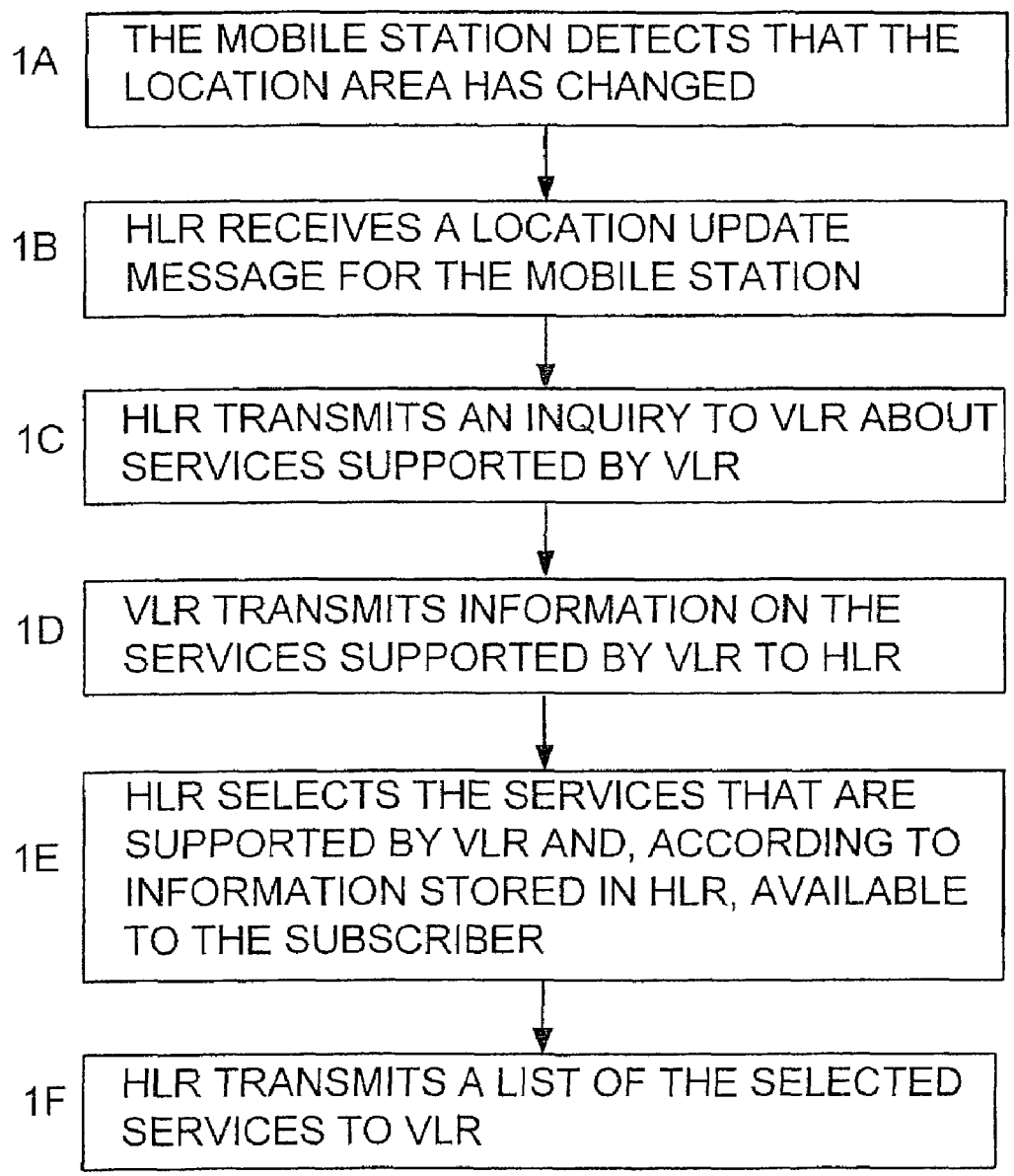

| | | | |
|---|---|---|---|
| 6,584,312 B1 * | 6/2003 | Morin et al. | 455/433 |
| 6,611,684 B1 * | 8/2003 | Franks | 455/433 |
| 6,718,173 B1 * | 4/2004 | Somani et al. | 455/456.1 |

FOREIGN PATENT DOCUMENTS

| | | | |
|---|---|---|---|
| EP | 1065904 A1 * | 1/2001 | |
| WO | WO 97/07641 | 2/1997 | |
| WO | WO 98/08354 | 2/1998 | |
| WO | WO 99/26428 | 5/1999 | |

* cited by examiner

PROCESSING SUBSCRIBER DATA REGARDING SERVICES AVAILABLE TO A SUBSCRIBER IN A VISITED AREA

This is a National Stage application of International Application No. PCT/FI00/01050, which was filed on Nov. 30, 2000, which designated the U.S., and was filed in the English language.

The present invention is related to updating the subscriber service data in a mobile communication system. The invention relates particularly to services available to a user and to transmitting information on the range of services when a mobile station moves in the mobile communication network.

In the GSM (Global System for Mobile Communications) system, for example, a previously known solution is, when a mobile station moves in the mobile communication network from the coverage area of one mobile services switching centre to the coverage area of another mobile services switching centre, to transmit subscriber data including information on services available to the subscriber from the home location register to the visitor location register of the mobile services switching centre in whose coverage area the mobile station is located at the particular moment. This transmission of information is carried out in connection with location update for example in such a manner that the home location register transmits a list of services available to the subscriber, and, subsequently, the visitor location register indicates whether there are such services included that cannot be implemented in the area of the mobile services switching centre corresponding to the visitor location register. Consequently, these services must be modified or replaced with other services.

A problem of the above-described system is that when the home location register transmits the list of services available to the subscriber it does not know which services the visitor location register supports. Not until the home location register has received a notification that the visitor location register does not support one or more services included in the list transmitted by the home location register can the home location register replace the services not supported by the visitor location register for example by modifying the additional features of the services and try to retransmit the service information. At worst, this sequence of transmissions can be repeated several times until only services that are supported by the visitor location register are included in the list. This causes additional transmissions of messages and also possible unnecessary costs. It is also extremely complex to program the system because the replacement procedure of the services must be taken into account.

An object of the invention is to solve the problem described above by providing a solution by means of which information on services available to the subscriber can be transmitted more flexibly from the home location register to the visitor location register and information on services not supported by the visitor location register can be better taken into account. This object is achieved by a method for processing subscriber service data in a mobile communication system, which method comprises receiving a location update message for a mobile subscriber at a home location register, selecting at the home location register the services that are supported by a visitor location register and, according to the information stored in the home location register, available to a subscriber, and transmitting from the home location register to the visitor location register a list of the selected services. Said method is characterized in that in order to provide the home location register with information about services supported by the visitor location register the method comprises the steps of transmitting an inquiry from the home location register to the visitor location register about services supported by the visitor location register, transmitting an answer to the inquiry from the visitor location register to the home location register, the answer containing information on the services supported by the visitor location register.

The invention is based on the idea that by transmitting information to the home location register on services supported by the visitor location register of the mobile services switching centre in whose area the mobile station is located, a list including only services that, according to the home location register, are available to the subscriber and that are supported by the visitor location register can be transmitted to the visitor location register by one message. The information on the services supported by the visitor location register is obtained such that after location update, the home location register transmits an inquiry to the visitor location register about services supported by the visitor location register. The visitor location register replies to the inquiry. Not until the home location register has received the information on the services supported by the visitor location register does the home location register transmit a list of services offered for the use of the subscriber.

Another object of the invention is to provide a mobile communication system where the method of the invention can be utilized such that information on services available to the subscriber can be transmitted more flexibly from the home location register to the visitor location register. This object is achieved with a mobile communication system comprising at least a first and a second mobile services switching centre and, in order to store subscriber data, a home location register having a data transmission connection to the first mobile services switching centre, and a visitor location register having a data transmission connection to the second mobile services switching centre, in which visitor location register information on mobile stations located in the coverage area of the second mobile services switching centre is maintained, wherein said home location register comprises means for transmitting information to the visitor location register on services that, according to the information stored in the home location register, are available to a subscriber and that are supported by the visitor location register, and said visitor location register comprises means for receiving the information transmitted by the home location register on the services available to the subscriber and supported by the visitor location register. Said mobile communication system is characterized in that the home location register comprises means for transmitting an inquiry to the visitor location register about services supported ported by the visitor location register in response to receiving a location update message, means for receiving a reply from the visitor location register and means for finding out the services supported by the visitor location register on the basis of the reply received from the visitor location register, and the visitor location register comprises means for receiving the inquiry about the services from the home location register, and means for transmitting the information to the home location register on the services supported by the visitor location register in response to the inquiry.

Another object of the invention is to provide a home location register of a mobile communication network, which home location register can be utilized in a mobile communication system in accordance with the present invention, such that information on services available to the subscriber can be transmitted more flexibly from the home location register to the visitor location register. This object is achieved with a home location register of a mobile communication network, in which home location register subscriber data on mobile subscribers registered in the network is maintained, the subscriber data comprising information on services available to the subscriber, which home location register comprises means for transmitting information to a visitor location register on services that, according to the information stored in the home location register, are available to the subscriber and that are supported by the visitor location register. The home location register of the invention is characterized in that the home location register comprises means for transmitting an inquiry to the visitor location register about services supported by the visitor location register in response to receiving a location update message, means for receiving a reply from the visitor location register, and means for finding out the services supported by the visitor location register on the basis of the reply received from the visitor location register.

Another object of the invention is to provide a visitor location register of a mobile communication network, which visitor location register can be utilized in a mobile communication system in accordance with the invention, such that information on services available to the subscriber can be transmitted more flexibly from the home location register to the visitor location register. This object is achieved with a visitor location register of a mobile communication network, in which visitor location register information necessary for transmitting calls on mobile subscribers located in the coverage area of a mobile services switching centre at a given time is maintained, which visitor location register comprises means for receiving information transmitted by the home location register on services available to a subscriber and supported by the visitor location register. The visitor location register of the invention is characterized in that the visitor location register comprises means for receiving an inquiry about services from a home location register, and means for transmitting information to the home location register on the services supported by the visitor location register in response to the inquiry.

Hence, the most significant advantages of the system and apparatus of the invention are that the number of messages to be transmitted is reduced and complex sequences of replacements of services can be avoided. Information about a correct range of services can thus be transmitted to the visitor location register in a faster and simpler manner.

The preferred embodiments of the mobile communication system and home location register of the invention are disclosed in the attached dependent claims.

Figure 2:
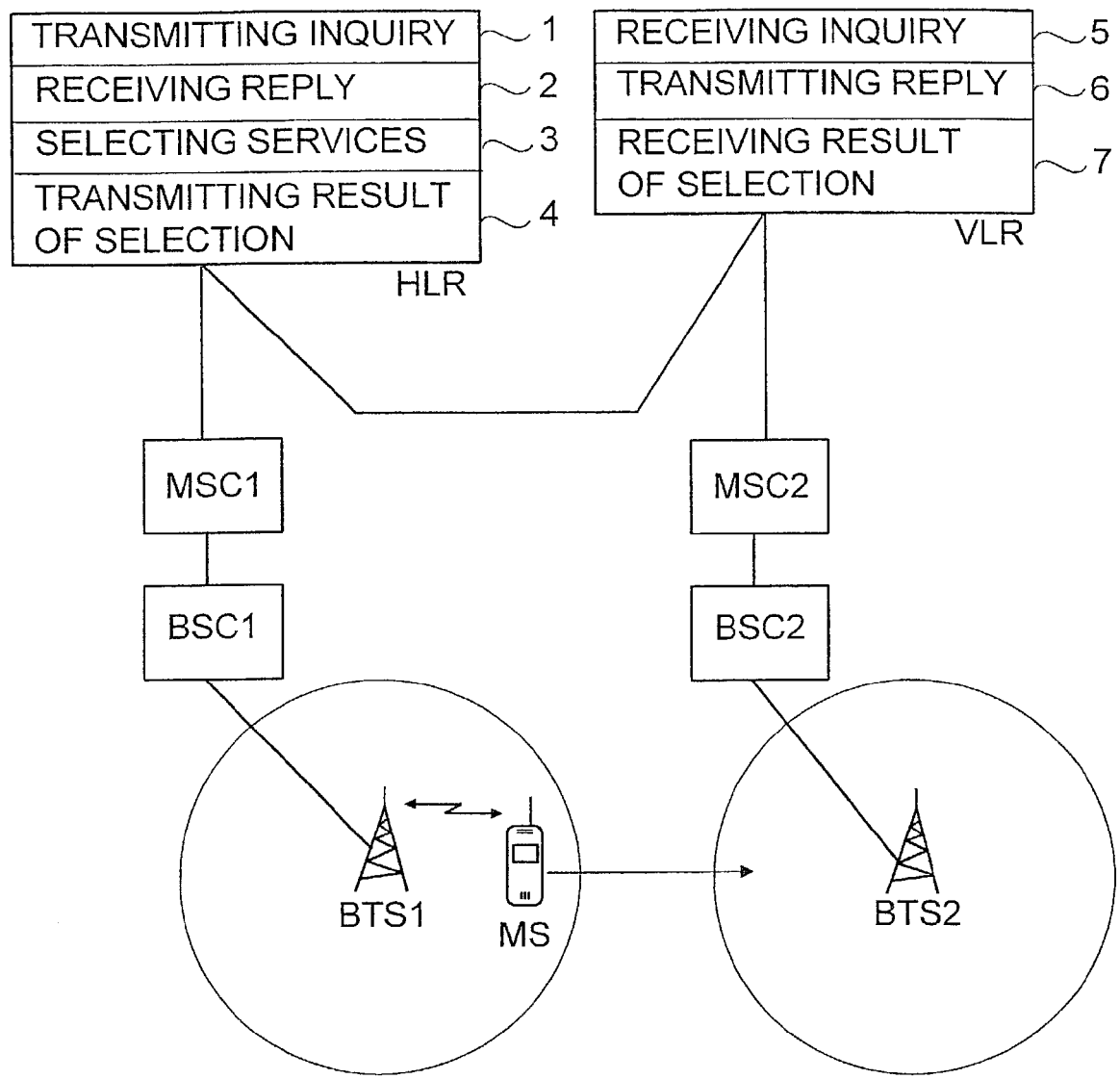

The invention is now described in closer detail with reference to attached drawings, in which FIG. 1 shows a flow chart of a method in accordance with the invention, and FIG. 2 shows a block diagram of a mobile communication system in accordance with the invention.

FIG. 1 shows a flow chart of a method in accordance with the invention. When the mobile station moves from the coverage area of the first mobile services switching centre to the coverage area of the second mobile services switching centre, the mobile station detects in step 1A that the location area has changed. This results in location update. The visitor location register inquires identification data on the subscriber of the mobile station and in step 1B a location update message is received at the home location register. When the home location register has received the location update message, the information about the services available to the mobile subscriber must be transmitted from the home location register to the visitor location register by a message. Services included can be, for example, in accordance with part 09.02 of the GSM specification, in which case the MAP_INSERT_SUBSCRIBER_DATA message used comprises the following parameters:

Invoke Id
IMSI
MSISDN
Category
Subscriber Status
Bearer Service List
Teleservice List
Forwarding Information List
Call Barring Information List
CUG Information List
SS-Data List
Operator Determined Barring General Data
Operator Determined Barring HPLMN Data
Roaming Restriction Due To Unsupported Feature
Regional Subscription Data
SS-Code List
Regional Subscription Response
User Error
Provider Error.

In step 1C inquiry transmission means of the home location register transmit an inquiry to inquiry reception means of the visitor location register about services supported by the visitor location register. In step 1D reply transmission means of the visitor location register transmit the information on the services supported by the visitor location register to reply reception means of the home location register. Subsequently, in step 1E, service selection means of the home location register find out, after receiving the reply from the visitor location register, which services are supported by the visitor location register and, according to the information stored in the home location register, available to the subscriber. In step 1F selection result transmission means of the home location register transmit a list of the selected services to selection result reception means of the visitor location register. This list comprises only services supported by the visitor location register, so there is no need for retransmissions or replacement procedures.

The home location register HLR can transmit the list of the services that are available to the subscriber as a MAP_INSERT_SUBSCRIBER_DATA message in accordance with part 09.02 of the GSM specification, the message including a bearer service list, teleservice list, forwarding information list, call barring information list and closed user group information list CUG, for example.

FIG. 2 shows a block diagram of a mobile communication system in accordance with the invention, the mobile communication system being a cellular GSM system in the present example.

The mobile communication system described comprises a mobile station MS, two base transceiver stations BTS1 and BTS2, two base station controllers BSC1 and BSC2, two mobile services switching centres MSC1 and MSC2, and a home location register HLR having a data transmission connection to the first mobile services switching centre MSC1 and a visitor location register VLR having a data transmission connection to the second mobile services switching centre MSC2. The bidirectional arrow in the figure designates a radio connection.

The home location register HLR comprises inquiry transmission means 1 for transmitting an inquiry to the visitor location register VLR about services supported by the visitor location register VLR, reply reception means 2 for receiving the answer of the inquiry from the visitor location register VLR, service selection means 3 for finding out the services supported by the visitor location register VLR and available to the subscriber and selection result transmission means 4 for transmitting a list of the selected services to the visitor location register VLR. The visitor location register VLR comprises inquiry reception means 5 for receiving the inquiry from the home location register HLR, reply transmission means 6 for transmitting the information on the services supported by the visitor location register VLR to the home location register HLR and selection result reception means 7 for receiving the list of selected services from the home location register HLR.

In practice, all means presented as blocks 1 to 7 of the home location register HLR and the visitor location register VLR can be implemented by one or more computer programs.

It is obvious to those skilled in the art that as technology progresses the basic idea of the invention can be implemented in many ways. The invention and its embodiments are thus not restricted to the examples disclosed above but they can vary within the scope of the claims.

The invention claimed is:

1. A method for processing subscriber service data in a mobile communication system, the method comprising:
   receiving a location update message for a mobile subscriber at a home location register;
   selecting, at the home location register, services that are supported by a visitor location register and which are, according to the information stored in the home location register, available to a subscriber; and
   transmitting, from the home location register to the visitor location register, a list of the selected services;
   transmitting an inquiry from the home location register to the visitor location register regarding services supported by the visitor location register; and
   in response to the inquiry, transmitting an answer from the visitor location register to the home location register, the answer containing information relating to the services supported by the visitor location register.

2. A mobile communication system, comprising:
   at least a first and a second mobile services switching center;
   a home location register configured to store subscriber data and having a data transmission connection to the first mobile services switching center, and
   a visitor location register having a data transmission connection to the second mobile services switching center, said visitor location register maintaining visitor location register information concerning mobile stations located in the coverage area of the second mobile services switching center,
   wherein said home location register comprises means for transmitting information to the visitor location register concerning services that, according to information stored in the home location register, are available to a subscriber and that are supported by the visitor location register,
   wherein said visitor location register comprises means for receiving the information transmitted by the home location register,
   wherein the home location register comprises:
   means for transmitting an inquiry to the visitor location register about services supported by the visitor location register in response to receiving a location update message,
   means for receiving a reply from the visitor location register, and
   means for finding out the services supported by the visitor location register on the basis of the reply received from the visitor location register, and
   wherein the visitor location register comprises:
   means for receiving the inquiry about the services from the home location register, and
   means for transmitting the information to the home location register concerning the services supported by the visitor location register in response to the inquiry.

3. The system of claim 2, wherein said at least a first and a second mobile services switching center are configured to operate in a GSM system.

4. The communication system of claim 2, wherein said means for transmitting information to the visitor location register transmits said information by a MAP_INSERT_SUBSCRIBER_DATA message in accordance with part 09.02 of the GSM specification.

5. A method for processing subscriber service data in a mobile communication system, the method comprising, in the order indicated:
   receiving, at a home location register (HLR), a location update message relating to a mobile subscriber;
   next, in response to the location update message, inquiring about services supported by an associated visitor location register (VLR);
   in response to the inquiry, transmitting information to the HLR relating to services supported by the associated VLR;
   then, based upon both the services supported by the associated VLR and specific subscriber services available to the mobile subscriber at the HLR, transmitting, from the HLR, a list of selected subscriber services to the associated VLR.

6. A mobile communication system, comprising:
   a first mobile services switching center and a second mobile services switching center;
   a home location register (HLR) having data transmission connectivity to the first mobile services switching center, said HLR being configured to store subscriber service information relating to a specific mobile subscriber and to receive a location update message relating to the specific mobile subscriber;
   a visitor location register (VLR) having data transmission connectivity to the second mobile services switching center, said VLR being configured to maintain VLR information concerning mobile stations located in a coverage area of the second mobile services switching center, to first receive an inquiry from the HLR regarding services supported by the VLR, and then to respond to the inquiry by identifying services that are supported by the VLR to the HLR;
   wherein said HLR transmits specific subscriber information to the VLR concerning services that are both available to the specific mobile subscriber and that have been identified as being supported by the VLR.

* * * * *